United States Patent Office 3,644,463
Patented Feb. 22, 1972

3,644,463
PRODUCTION OF ALIPHATIC
1,2-BISTHIOCYANATES
Richard Parke Welcher, Old Greenwich, Conn., assignor to American Cyanamid Company, Stamford, Conn.
No Drawing. Filed May 15, 1968, Ser. No. 729,375
Int. Cl. C07c *161/02*
U.S. Cl. 260—454      5 Claims

ABSTRACT OF THE DISCLOSURE

Aliphatic 1,2-bisthiocyanates are produced by first preparing a solution of thiocyanogen in a water-insoluble liquid organic solvent such as toluene having an aqueous solution of an inorganic halide admixed therewith, drawing off the aqueous phase, adding an alpha-olefin or acetylene and reacting at a temperature below about 20° C. and preferably about 0°–10° C.

---

This invention relates to a method for producing aliphatic 1,2-bisthiocyanates. More particularly, it is directed to the production of symmetrical ethylene and vinylene bis-thiocyanates, which are known to be highly effective algicides and bactericides, and to the production of the corresponding alkyl, aryl and cycloalkyl-substituted derivatives of these compounds.

Heretofore reactions involving thiocyanogen have always been carried out in non-aqueous systems because of the known sensivity of thiocyanogen to water. In fact, the sensitivity of thiocyanogen is such that in most preparations it is produced in situ as it is reacted. Thus in U.S. Pat. No. 3,308,150 dithiocyanates of cycloolefinic hydrocarbons are produced by the action of nascent thiocyanogen that is liberated from sodium thiocyanate and copper sulfate in alcoholic solution or in anhydrous glacial acetic acid, or by adding bromine to an anhyrous suspension of plumbous thiocyanate in dry benzene.

I have now discovered that thiocyanogen can be reacted effectively with olefins and acetylenes in water-immiscible liquid organic solvents that are not necessarily anhydrous. This is a very important discovery from the standpoint of large-scale manufacture of aliphatic thiocyanate bactericides, for I have also found that thiocyanogen can be produced more rapidly and in good yields in a two-phase, water-containing system. This discovery is described and claimed in my copending application, Ser. No. 729,338 filed concurrently herewith.

The process of my present invention is therefore essentially a two-step process. In the first step a solution of thiocyanogen in a water-insoluble liquid organic solvent mixed with an aqueous salt solution is prepared, preferably by reacting a halogen with a water-soluble thiocyanate salt dissolved in water having the organic solvent in admixture therewith. In the second step the aqueous salt solution is simply drained off and the organic solvent solution of thiocyanogen, without dehydration, is maintained at a temperature below that at which the thiocyanogen will polymerize, and preferably below about 20° C., as an alpha-unsaturated hydrocarbon reagent or a cycloolefin hydrocarbon reagent is introduced. The resulting reaction is preferably carried out in the presence of a free radical-type catalyst. Under these conditions good yields of the desired reaction product are obtained, despite the presence of residual water that may be present from the first step. The resulting bisthiocyanate product can then be recovered by vacuum evaporation of the solvent or by other means.

The principles of the invention can be applied for the production of any aliphatic 1,2-bisthiocyanate, depending on the character of the unsaturated hydrocarbon reagent that is introduced. Thus, for example, good yields of 1,2-vinylene-bisthiocyanate are obtained by adding acetylene gas, while the addition of ethylene results in the production of 1,2-dithiocyanoethane. The corresponding monoalkyl-substituted vinylene bisthiocyanates are produced when monoalkyl acetylene containing an alkyl radical of from 1 to 16 carbn atoms are used, such as methylacetylene, heptyne, octyne, octadecyne, and the like. Monoalkyl-dithiocyanoethanes are produced in similar manner when monoalkylethylenes containing alkyl radicals of 1–16 carbon atoms are used; typical of these are propylene, isobutylene, octylethylene, hexadecyl-ethylene and the like. Dialkyl ethylenes may likewise be used, the preferred reagents being those wherein the two alkyl substituents taken together have a total of from 2 to 16 carbon atoms. Aryl-substituted olefins such as styrene may also be used. The principles of the invention can also be applied when cycloolefins of from 5 to 10 carbon atoms are used, such as cyclopentene, cyclohexene and terpenes such as beta-pinene.

While the reaction between the thiocyanogen and the unsaturated hydrocarbon will proceed in the absence of a catalyst, it is initiated much faster when a free radical-type catalyst is present. Any of the well-known free radical catalysts used in other olefin condensation and polymerizations may be used such as peroxides, hydroperoxides, azo-type catalysts such as azobisisobutyronitrile and the like. These and other similar catalysts are preferably employed in quantities within the range of about 0.1% to 10% and preferably about 1–5%, based on the weight of the thiocyanogen. Actinic light such as sunlight or that obtained from a mercury vapor lamp may also be used as a free radical initiator.

While the unsaturated hydrocarbon will react with thiocyanogen at any temperature up to about 80°–90° C., the mixture should preferably be held at a much lower temperature, but above the freezing point of the reactant mixture, in order to avoid excessive losses due to the polymerization of thiocyanogen. This polymerization can be noted at temperatures above about 20° C., and is substantial or appreciable at temperatures up to 40° C. its rate depending on the concentration of thiocyanogen present and on the type of solvent used. It will be understood, therefore, that the term thiocyanogen-polymerizing temperatures is intended to designate a temperature or temperature range at which the thiocyanogen will react with itself by polymerization faster than it will react with the olefin or acetylene used, this temperature ordinarily being in the range of about 20°–40° C. or higher.

While any water-immiscible liquid organic solvent such as a chlorinated, aliphatic or cycloaliphatic hydrocarbon may be used, the mononuclear aromatic hydrocarbons such as benzene, toluene, ethylbenzene, ortho-xylene and meta-xylene are preferred, as thiocyanogen solutions in these hydrocarbons are storage-stable. The preferred solvents of this class are benzene, toluene, and ortho- and meta-xylenes and xylene mixtures as they are relatively inexpensive and can readily be separated from the aliphatic bisthiocyanate products.

The invention is not limited by the thiocyanate salt used in the first step of the process, or by the halogen employed. The alkali metal, ammonium and alkaline earth metal thiocyanates are preferred starting materials because they are both water-soluble and form water-soluble halides with chlorine, bromine, fluorine and iodine. Similarly, fluorine, chlorine or bromine may be used, but chlorine is preferred because it is both cheap and abundant. In carrying out the first step of the process it is preferred to employ a quantity of water such that a concentrated and preferably saturated aqueous salt solution is produced, as this assists in extraction of the thiocyanogen into the organic solvent as it is formed. The quantity of organic solvent should be relatively large, usually about 3 to 10 times the weight of the water for much the same reason.

The invention will be further described and illustrated by the following examples, which set forth preferred embodiments thereof. It should be understood, however, that although these examples may describe certain specific features of the invention, they are given primarily for illustrative purposes and the invention in its broader aspects is not limited thereto.

EXAMPLE 1

A glass lined reaction kettle equipped with a cooling jacket and an agitator was charged with a solution of 130 pounds of sodium thiocyanate in 100 pounds of water and 780 pounds of toluene were added. The charge was cooled to 5° C. and maintained at this temperature as 57 pounds of chlorine gas was introduced with agitation.

At this point the mixture in the kettle was yellow and some solid sodium chloride was present, indicating that the water was saturated with this salt. Agitation was stopped and the water phase separated and drawn off.

Residual chlorine was then removed by flushing with nitrogen after which 1 pound of diisopropyl peroxydicarbonate catalyst, dissolved in toluene, was added. Gaseous acetylene was then introduced, with continued agitation, for about 45 minutes, during which time the temperature was maintained within the range of about 2° to 9° C. Another 1-pound portion of catalyst was then added and the introduction of acetylene was continued at the same temperatures for another 45 minutes. Agitation and acetylene introduction were continued while the batch was allowed to warm slowly to 25° C. The batch was then warmed slowly to 35° C. and held at this temperature for 1 hour, after which it cooled to room temperature.

When the toluene was removed by vacuum evaporation there was obtained a moist-looking orange crystalline solid that melted at 77°–94° C. This was identified as vinylene bisthiocyanate. The wide melting point range and infrared spectrum indicated a mixture of the cis- and trans-isomers. The yield was 73%, based on the weight of sodium thiocyanate charged.

Vinylene bisthiocyanate is known to be an effective algicide and bactericide; see U.S. Pat. No. 3,212,963.

Other alkynes may be substituted for acetylene without changing the nature of this process. Typical examples are methyl acetylene or propyne, a gas, and heptyne

$(CH\colon C(CH_2)_4CH_3)$ and octyne $(CH\colon C(CH_2)_5CH_3)$ which are colorless liquids. Other monoalkyl acetylenes up to octadecyne $(CH\colon C(CH)_{16}CH_3)$ may be used. Arylacetylenes such as phenylacetylene and diphenylacetylene may also be used.

It will be noted that in the first stage of this process thiocyanogen is produced by the reaction in water solution of a halogen with a dissolved water-soluble thiocyanate salt such as an alkali metal, ammonium, or alkaline earth metal thiocyanate. For good results sufficient water should therefore be present to dissolve the thiocyanate salt completely. It is also important, however, to form a concentrated solution of alkali metal, ammonium or alkaline earth metal halide, as this assists the rapid and complete extraction of thiocyanogen into the toluene or other water-immiscible organic solvent. For this reason it is greatly preferable to add the thiocyanate salt as a concentrated aqueous solution. Where this is not feasible, additional halide salt may be added along with the thiocyanate salt (e.g. the sodium thiocyanate or other thiocyanate salt may be dissolved in NaCl-containing water) or water later on in the process after some of the thiocyanate salt has been reacted with halogen. In general, however, it is preferred to maintain a weight ratio of alkali metal thiocyanate to water not greater than about 1.5 to 1 nor less than about 0.3:1.

The ratio of water to toluene or other water-immiscible thiocyanogen solvent is also important. At least three parts by weight of the solvent for each part of water is preferred for commercially acceptable yields. Optimum proportions will depend on the type of solvent; when benzene, toluene, ortho-xylene, meta-xylene or other liquid mononuclear aromatic hydrocarbons are used they are within the preferred range of 3 to 10 parts by weight of hydrocarbon for each part of water.

EXAMPLE 2

A glass reaction flask equipped with a stirrer, a thermometer and a gas inlet tube was charged with a mixture of 25 grams of water, 195 grams of toluene and 32.5 grams (0.4 mole) of sodium thiocyanate. The flask was placed in an ice bath and maintained at 5°–10° C. while 15.7 grams (0.222 mole) of gaseous chlorine was introduced with agitation. At this point the reaction mixture was yellow and some solid sodium chloride was present.

The flow of chlorine gas was then shut off and the system was flushed with nitrogen. A solution of 0.52 grams of diisopropyl peroxydicarbonate catalyst in 13 grams of toluene was added in two equal portions 45 minutes apart as gaseous ethylene was passed into the mixture with agitation, the temperature being maintained between 2° and 9° C. After 90 minutes the flow of ethylene was stopped, the ice bath was removed, and the mixture allowed to stand for 3 hours. A total of 4.9 grams of ethylene had been added.

After separating the hydrocarbon solvent layer and removing the solvent there was obtained 23 grams of 1,2-dithiocyanoethane, a bactericide known to be effective against such bacteria as *Aerobacter aerogenes* and *Pseudomonas aeruginosa*.

A wide variety of monolefin hydrocarbons may be substituted for the ethylene in this process. Thus any alpha-olefin of from 3 to 18 carbon atoms and having the formula

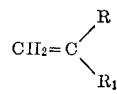

where R is an alkyl radical and $R^1$ is hydrogen or alkyl may be used, such as propylene, 1-butene, isobutylene, 1-amylene, pentylethylene, octylethylene, and the like. Internal olefins, aryl-substituted olefins such as styrene, and cyclic hydrocarbons such as cyclopentene, cyclohexene, cyclooctene and terpenes such as beta-pinene may also be used.

What I claim is:
1. A method of producing an aliphatic 1,2-bisthiocyanate which comprises preparing thiocyanogen in a water-insoluble organic solvent selected from the group consisting of benzene, toluene, ethylbenzene, ortho-xylene, meta-xylene, and mixtures thereof, having an aqueous solution of an inorganic halide admixed therewith by reacting a halogen selected from the group consisting of chlorine, and bromine with a water-soluble thiocyanate salt selected from the group consisting of alkali metal, alkaline earth metal, and ammonium salts of thiocyanic acid dissolved in water having said water-insoluble organic solvent admixed therewith, thereby extracting the thiocyanogen from the water phase into the organic solvent phase as it is formed, separating and removing the water phase, adding to the organic solvent phase an unsaturated hydrocarbon reagent of the group consisting of acetylene, monoalkylacetylenes containing an alkyl radical of from 1 to 16 carbon atoms, ethylene monoalkylethylenes containing an alkyl radical of from 1 to 16 carbon atoms, dialkylethylenes containing two alkyl radicals having a total of from 2 to 16 carbon atoms, and monophenyl-olefins and cycloolefins of from 5 to 10 carbon atoms, and reacting said reagent with said thiocyanogen in the presence of a free radical catalyst while maintaining a temperature from above about the freezing point of the reactant mixture to below about 90° C.

2. A method according to claim 1 wherein the unsaturated hydrocarbon is reacted with the thiocyanogen at a temperature below about 20° C.

3. A method according to claim 1 in which the halogen is chlorine.

4. A method according to claim 1 in which the hydrocarbon reagent is acetylene.

5. A method according to claim 1 in which the hydrocarbon reagent is ethylene.

References Cited
UNITED STATES PATENTS

| | | | |
|---|---|---|---|
| 1,859,399 | 5/1932 | Kaufmann | 260—454 |
| 2,212,175 | 8/1940 | Clayton et al. | 260—454 |
| 2,639,291 | 5/1953 | Pfann | 260—454 |
| 3,308,150 | 3/1967 | Stahly | 260—454 |
| 3,047,363 | 7/1962 | Field et al. | 23—151 |
| 3,212,963 | 10/1965 | Wehner | 260—454 |

FOREIGN PATENTS

| | | | |
|---|---|---|---|
| 21,517 | 1/1964 | Japan | 260—454 |
| 3,300 | 2/1967 | Japan | 260—454 |

LEWIS GOTTS, Primary Examiner

G. HOLLRAH, Assistant Examiner

U.S. Cl. X.R.

71—67; 124—302

UNITED STATES PATENT OFFICE
CERTIFICATE OF CORRECTION

Patent No. 3,644,463  Dated February 22, 1972

Inventor(s) RICHARD PARKE WELCHER

It is certified that error appears in the above-identified patent and that said Letters Patent are hereby corrected as shown below:

Column 1, line 38, delete "anhyrous" and substitute -- anhydrous -- .

Column 2, line 6, delete "acetylene" and substitute -- acetylenes -- .

Column 2, line 7, delete "carbn" and substitute -- carbon -- .

Column 2, line 25, delete "condensation" and substitute -- condensations -- .

Column 2, line 35, after the word "temperature" insert the following: -- , but above the freezing point of the reactant mixture, -- .

Column 3, line 71, delete the word "water".

Signed and sealed this 23rd day of July 1974.

(SEAL)
Attest:

McCOY M. GIBSON, JR.
Attesting Officer

C. MARSHALL DANN
Commissioner of Patents